US012811423B2

(12) United States Patent
De Jesus Cardoso Filho et al.

(10) Patent No.: US 12,811,423 B2
(45) Date of Patent: Nov. 24, 2026

(54) SYSTEM AND METHOD FOR ACTIVE POWER FLOW CONTROL AND EQUALIZATION FOR ELECTROCHEMICAL ACCUMULATORS CONNECTED TO THE ELECTRICAL GRID

(71) Applicants: Petróleo Brasileiro S.A.—Petrobras, Rio de Janeiro (BR); Universidade Federal De Minas Gerais—UFMG, Belo Horizonte (BR)

(72) Inventors: Braz De Jesus Cardoso Filho, Belo Horizonte (BR); Thales Alexandre Carvalho Maia, Belo Horizonte (BR); Tomás Perpetuo Corrêa, Belo Horizonte (BR); Anderson Vagner Rocha, Belo Horizonte (BR)

(73) Assignees: Petróleo Brasileiro S.A.—Petrobras, Rio de Janeiro (BR); Universidade Federal De Minas Gerais—UFMG, Belo Horizonte (BR)

( * ) Notice: Subject to any disclaimer, the term of this patent is extended or adjusted under 35 U.S.C. 154(b) by 1015 days.

(21) Appl. No.: 18/081,444

(22) Filed: Dec. 14, 2022

(65) Prior Publication Data

US 2023/0187957 A1 Jun. 15, 2023

(30) Foreign Application Priority Data

Dec. 15, 2021 (BR) ...................... 10 2021 025348 7

(51) Int. Cl.
*H02J 7/90* (2026.01)
*H02J 7/50* (2026.01)
(Continued)

(52) U.S. Cl.
CPC ................ *H02J 7/933* (2026.01); *H02J 7/50* (2026.01); *H02J 7/80* (2026.01); *H02M 3/1582* (2013.01)

(58) Field of Classification Search
USPC .......................................................... 320/136
See application file for complete search history.

(56) References Cited

U.S. PATENT DOCUMENTS 9,641,013 B2 5/2017 Lee et al.
11,081,733 B2 8/2021 Wang et al.
(Continued)

FOREIGN PATENT DOCUMENTS

BR PI0608550 A2 1/2010
CA 2816843 C * 12/2019 .............. H02J 7/875
(Continued)

*Primary Examiner* — Mohammed Alam
(74) *Attorney, Agent, or Firm* — Morrison & Foerster LLP

(57) ABSTRACT

The invention addresses to a system and method that allow controlling the individual power flow of each battery, being indicated for energy accumulator systems of the electrochemical-battery type, solidly connected to the electrical grid, respecting each of its characteristics during operation. Thus, if the batteries present different states of charge, the system will be responsible for draining from each battery only the amount of energy that can be used. For different states of health, charge and life, the performance and discharge capacity are preserved. For degraded batteries, the system allows their replacement without the need of replacing the entire bank, including batteries with different technologies.

4 Claims, 5 Drawing Sheets

(51) Int. Cl.

| | |
|---|---|
| ***H02J 7/80*** | (2026.01) |
| ***H02M 3/158*** | (2006.01) |

(56) References Cited

U.S. PATENT DOCUMENTS

| | | | | |
|---|---|---|---|---|
| 11,081,897 | B2 | 8/2021 | Reineccius | |
| 2017/0246963 | A1 * | 8/2017 | Lee | H01M 10/425 |
| 2025/0385325 | A1 * | 12/2025 | Li | H01M 10/4257 |

FOREIGN PATENT DOCUMENTS

| | | | |
|---|---|---|---|
| JP | 5522804 | B2 | 6/2014 |
| WO | 2016207663 | A1 | 12/2016 |

* cited by examiner

SYSTEM AND METHOD FOR ACTIVE POWER FLOW CONTROL AND EQUALIZATION FOR ELECTROCHEMICAL ACCUMULATORS CONNECTED TO THE ELECTRICAL GRID

CROSS-REFERENCE TO RELATED APPLICATION

This application claims priority to Brazilian Application No. 10 2021 025348 7 filed on Dec. 15, 2021, and entitled "SYSTEM AND METHOD FOR ACTIVE POWER FLOW CONTROL AND EQUALIZATION FOR ELECTROCHEMICAL ACCUMULATORS CONNECTED TO THE ELECTRICAL GRID," the disclosure of which is incorporated herein by reference in its entirety.

FIELD OF THE INVENTION

The present invention is related to the field of energy accumulator systems of the electrochemical battery type, solidly connected to the electrical grid. The invention acts by increasing the useful life of an energy accumulator bank using electrochemical batteries through the use of electronic systems in the battery interface and a central controller commanding the joint operation.

DESCRIPTION OF THE STATE OF THE ART

The technical problem that motivated the invention was the need of controlling the individual power flow of each battery, respecting each of its characteristics during operation, in order to extend the useful life of the accumulator bank, reducing the need for maintenance and early replacement of the battery bank.

Document U.S. Pat. No. 11,081,897B2 discloses a system for charging and discharging batteries. The system has a sensor that monitors an amount of energy flowing through a power supply that is in electrical communication with an electrical energy supplier and generates power information that is synchronized with a reference time. The system also has an energy storage unit comprising one or more batteries and a bidirectional energy converter that controls a first amount of energy transferred in either direction between the power supply and one or more batteries, where the energy storage unit energy provides a state of charge of one or more batteries. In addition, it is said that the system also has a control computer configured to receive, from the sensor, the power information, receive, from the energy storage unit, the first state of charge and provide, to the energy storage unit, energy, and based on each of the power information and the state of charge/discharge, a charge/discharge instruction, where the energy storage unit, in response to the charge/discharge instruction, charges/discharges one or more batteries to mitigate variations in energy carried through the power supply. The system has a sensor that monitors an amount of energy flowing through a power supply that is in electrical communication with an electrical energy supplier and generates power information that is synchronized with a reference time.

Document US1108173382 discloses a battery management system comprising a printed circuit board, a gas meter, a microcontroller and a switch circuit. The printed circuit board can be a system motherboard to integrate other components. The printed circuit board can be used as a connection board to adapt a plurality of batteries to form the smart battery with a desired capacity and configuration. The system may comprise a meter, taking various measurements, for example parameters related to voltage/current protections. Such measurements may include, but are not limited to: a voltage, a current, a capacity, a life cycle, a temperature and/or similar parameters of the battery.

Document PI0608550A2 discloses a battery power supply system for connecting an electronic device having a main rechargeable battery, an additional battery comprising at least one primary cell and at least one rechargeable cell and a bidirectional charge controller controlling current flow between the additional battery and the rechargeable battery. The controller is also said to act as a converter to convert current output from the additional battery in a first nominal terminal voltage into a second voltage for energizing the device.

Document WO2016207663A1 refers to a system that contains a common control block and control blocks of each of the numerous battery cells, where each cell of the plurality of cells is controlled by its own control block, which contains a microcontroller that has the ability to receive data about the condition of the cell, transfer the received information to the common control block and balance the cell voltages by high currents (upon receiving a control command from the common control block), where the balance mode operates efficiently in any battery operating mode (during charging, during discharging and in standby), where the plurality of battery cells of the accumulator are connected in series by direct current, and in parallel by alternating current through of the DC/AC converter balancing system, where the converters are synchronized by the common control signal of the common control block. It is reported that the invention reduces the charging time and increases the battery discharge time. This document, however, does not discuss the details of the application, presenting generic information, and not detailing the electronic components in order to characterize its application.

Document JP5522804B2 presents a charge equalization apparatus and method for a battery string connected in series and, more particularly, a charge equalization apparatus and method that efficiently performs charge equalization, reducing all complexity and volume and reducing the production costs by means of a configuration that includes a single battery in a battery string sharing a single voltage sensing module and a single charge equalization module; a switching block of a two-stage structure forms a current path for measuring the voltage of individual batteries included in the battery string and, at the same time, forms a path for charging or discharging an undercharged or overcharged battery among the battery strings; and a switching device with low affordable voltage is used. The document, however, does not present an electronic system of active and bidirectional control, allowing the system to equalize both during recharge and discharge.

Document U.S. Pat. No. 9,641,013B2 teaches a method for balancing the voltages of a battery bank that includes (a) a voltage measurement step to measure the voltages of the battery banks, (b) a sorting step of sorting the banks of batteries in rising powers based on rack voltage values, (c) a comparison step of comparing a difference between a maximum voltage value and a minimum voltage value with a defined voltage, (d) a charge/discharge counting step of comparing the voltage values of the battery banks with a reference voltage to increase a charge or discharge counting, and (e) a charge/discharge step to charge or discharge the racks according to the charge or discharge counting. In the event that, in step (c), the difference between the maximum voltage value and the minimum voltage value is less than the defined voltage, the battery banks are charged with the maximum voltage value without steps (d) and (c). This document does not describe equipment, active and bi-directional control. In addition, it does not allow the system to have extensive control, both during the discharge and the recharge.

Thus, the state of the art does not provide solutions capable of controlling the individual power flow of each battery in a battery bank, in order to respect each of its characteristics during operation, and allow the extension of the useful life of the accumulator bank, reducing maintenance interventions and also the early replacement of the bank.

OBJECTIVE OF THE INVENTION

It is an objective of the invention to act by controlling the individual power flow of each battery, respecting each of its characteristics during operation.

It is an objective of the invention to act by draining from each battery only the amount of energy that can be used, if the batteries present different states of charge.

It is an objective of the invention to act in different states of health, to preserve performance and discharge capacity.

It is an objective of the invention to act on degraded batteries, to allow their replacement without the need of replacing the entire bank, even allowing the replacement by batteries of different technology.

BRIEF DESCRIPTION OF THE INVENTION

The invention operates by controlling the individual power flow of each battery, respecting each of its characteristics during operation. As an example, if the batteries have different states of charge, the system will be responsible for draining from each battery only the amount of energy that can be used. For different states of health, performance and discharge capacity are preserved. For degraded batteries, the system and method allow the replacement of the same without the need of replacing the entire bank.

BRIEF DESCRIPTION OF THE DRAWINGS

The present invention will be described in more detail below, with reference to the attached figures which, in a schematic way and not limiting the inventive scope, represent examples of its embodiment. In the drawings, there are:

FIG. 1A further illustrates the connection interface between the energy accumulator bank and the electrical grid. This equipment is an illustration of a commercially available equipment, whose function is to dispatch or charge energy from a bank of batteries and inject it into the electrical grid. By applying the system and method proposed in this invention, this equipment is preserved. FIG. 1A shows the components: AC-DC converter (A), battery with a first type of electrochemistry, for example lithium-ion, together with the DC-DC converter, responsible for composing a power flow control element for system operation (B), battery with a second type of electrochemistry, for example lead-acid, together with a DC-DC converter, together with another DC-DC converter, responsible for composing another power flow control element for system operation (C). The necessary hardware for operation is the same for item (B) and (C) changing only the battery type. The last item illustrated is the communication bus using CANBus, but any other communication buses also apply, such as Modbus, Profibus, Ethernet and others (D).

FIG. 1B further illustrates an accumulator element (1) and a DC-DC electronic converter (2).

FIG. 1C further illustrates an accumulator element (1).

FIG. 3 serves as an illustration of one of the ways in which the system can operate. Its components are represented by: electrical grid (H), photovoltaic cell (I), photovoltaic converter (J), grid converter (K), batteries (L), accumulator bank converter (M), connection bus (N), charge (O), and reference charge (P). FIG. 3 also shows two plots of power (MW)×hours of day.

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

Among the advantages of adopting an energy accumulator bank that uses electrochemical batteries, we can mention its robustness and reliability. However, the useful life of the bank and the acquisition cost are still decisive factors for its adoption.

A typical scenario for using an accumulator system is the displacement of demand between generation and consumption, called time-shift. This type of operation can be characterized by two types of basic operation, peak shaving and load leveling, the second being the responsibility of the system operator. In particular, the peak shaving operation demands a correct sizing of the components of the energy accumulator system, in order to avoid an early degradation throughout its useful life.

The result of the invention is the increase in the useful life of an accumulator bank that uses electrochemical batteries for operation connected to the electrical grid operating, for example, in peak shaving mode. The use of the invention makes it possible to overcome the limitations of accumulator systems described in the state of the art.

The system incorporates the use of electronics in an energy accumulator system of electrochemical batteries, such as lead-acid batteries, lithium ions and others. The addition of a controlled electronic DC-DC converter allows energy management in the accumulator system, preventing the batteries from being used incorrectly and degrading early. Even in a scenario where battery degradation may occur, the electronics can partially circumvent the failure, increasing the reliability and longevity of the energy accumulator bank. Indirectly, the accumulator becomes more profitable due to the reduction in maintenance, increased service life and increased operational safety.

The system consists of three basic elements, the battery, the electronics responsible for dispatching the power of each battery to the bank and a control algorithm, identified here as the central controller. The central controller can be embedded in any device that allows communication with the DC-DC converters. Its function is to request data from each battery, calculate all the properties of state of charge and health and make the decision, informing how each element should behave within the bank.

Figure 1A:
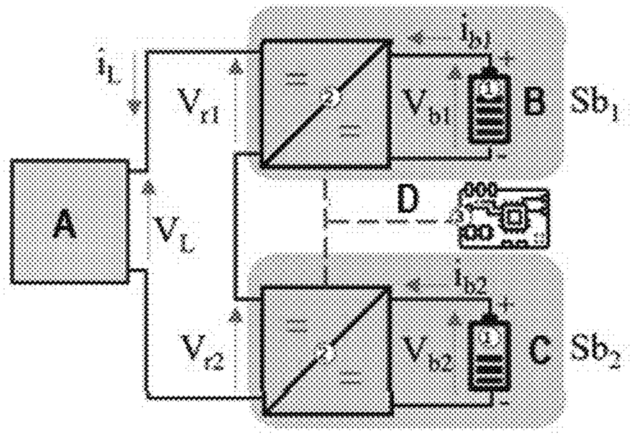
FIG. 1A illustrates the system and its components, wherein there are represented: an accumulator element (1), a DC-DC electronic converter (2), and a central controller (3).
Figure 1B:
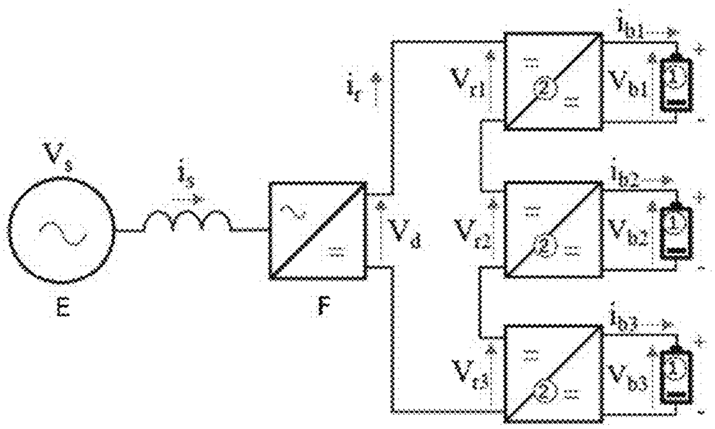
FIG. 1B illustrates the complete system with three hardware units in series, each unit being able to contain any type of battery in different states of charge. Their components are represented by: power grid (E), central charger, AC-DC converter (F).
Figure 1C:
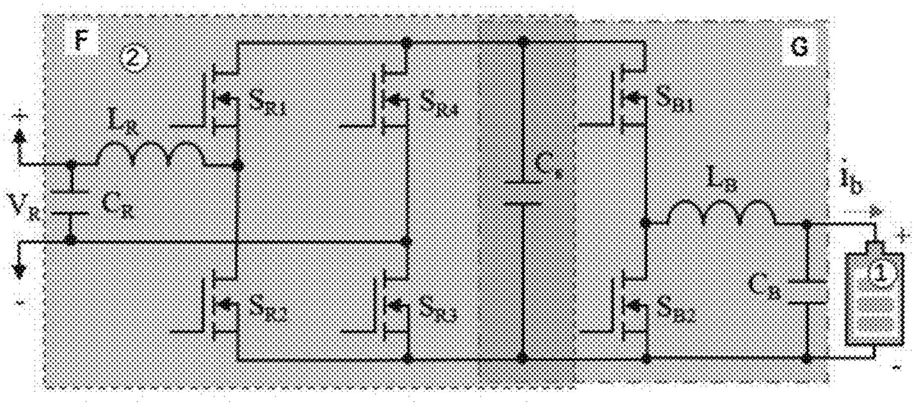
FIG. 1C illustrates the details of the hardware developed to operate the system, including semiconductor elements, sensors, gate-drives and passive components. The hardware is identified through two interfaces, each one responsible for controlling a specific energy flow. The first is the interface with the central charger (F) and the second is the interface with each accumulator element (G).
Figure 2:
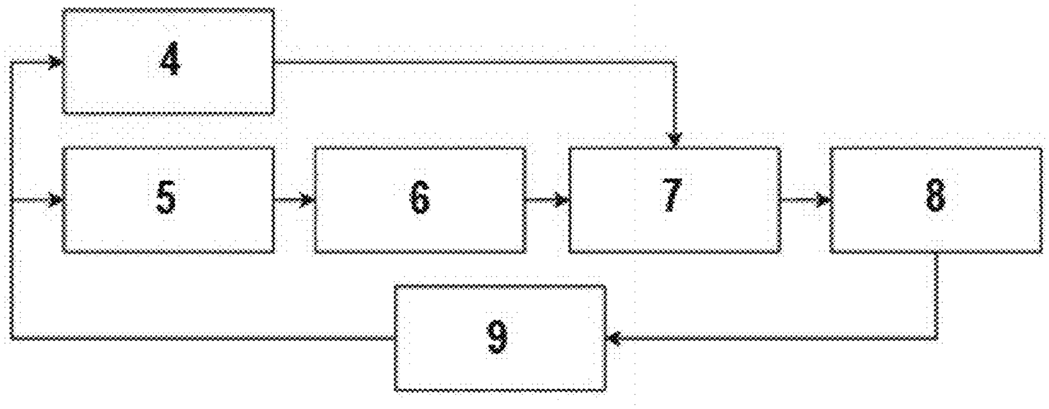
FIG. 2 illustrates the method of operation of the system, wherein there are represented: charge power demand (4), measurement of voltage, current and temperatures of the batteries (5), estimate of the state of health of charge and battery health (6), calculation of the power per battery (7), dispatch of the power in each battery (8), processing of all data in the central controller (9).

The system components are described below: (1) Accumulator element, (2) DC-DC electronic converter and (3) central controller. The items (1) and (2) are connected in series or parallel according to bank demand. FIG. 1 shows the system, where items (1) and (2) are connected in series according to the bank demand, but could, if necessary, be connected in parallel. Depending on the power of the energy accumulator bank and the specification of the AC-DC converter, the terminal voltage of the accumulator bank may be higher or lower, requiring the series connection of several elements so that the voltage is compatible. In FIG. 1, only two components are illustrated. Item (1) can be any electrochemical battery. The electronics, illustrated by item (2), consists of a buck-boost-type DC-DC converter, which can use any topology that allows bidirectional power flow. It consists of power semiconductor devices, voltage and current sensors, gate-drive, and passive elements such as resistors, capacitors and inductors, in addition to active elements such as operational amplifiers and interface for communication on the communication bus, for example, CANBus.

The invention is indicated for energy accumulator systems of the electrochemical battery type, solidly connected to the electrical grid. The objective is to improve the accumulator performance in operations, for example, of the time-shift type, prolonging its useful life, and facilitating its maintenance and operation.

The method for active control of power flow and equalization for electrochemical accumulators connected to the power grid is described below:

1—acting on the power demand of the charge;

2—measuring battery voltage, current and temperature;

3—estimating the state of charge, health and life of each battery in the bank;

4—calculating the energy to be dispatched by battery in the bank;

5—dispatching energy proportional to its state of health, charge and life in each battery of the bank;

6—processing all data in the central controller, receiving and dispatching all information in the communication bus.

The bank will work according to the demand of the charge, which informs how much voltage and current it is necessary for the bank to deliver. Based on these values, each battery informs the central controller of its basic characteristics, such as voltage, current and temperature. Based on data from all batteries, the central controller calculates the state of charge of each element and its state of health. Depending on what each battery is capable of delivering, in terms of energy, the controller defines that the best batteries should deliver more energy, while the other batteries should deliver a smaller amount. This whole process is continuous and happens uninterruptedly until all the energy in the bank is completely drained.

EXAMPLE

The following example is presented in order to more fully illustrate the nature of the present invention and the way to practice the same, without, however, being considered as limiting its content.

Figure 3:
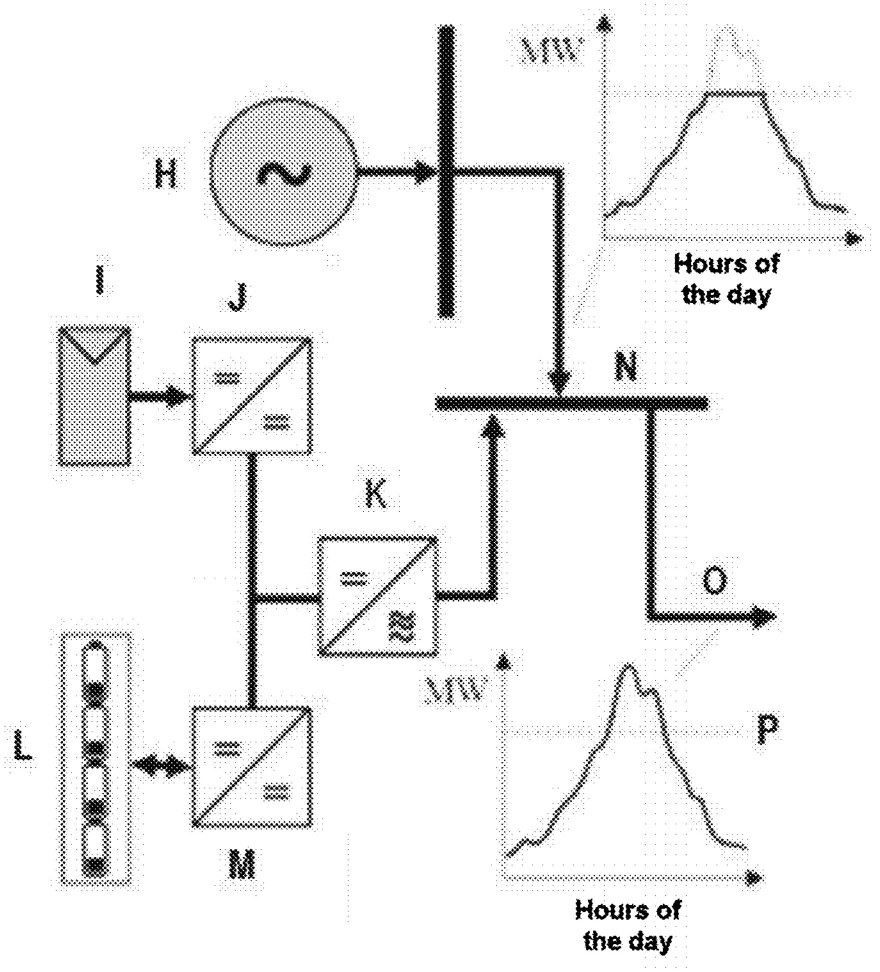
FIG. 3 illustrates the operation of an energy accumulator system together with a photovoltaic plant.

For a better understanding of the operation of the system, a case study is exemplified, in which an energy accumulator system, using batteries, is charged and discharged daily. The charging profile follows the solar availability during the generation of an actual photovoltaic plant. Subsequently, the stored energy is discharged at the time with the highest tariff cost. FIG. 3 illustrates the operation, where part of the charge demand is supplied by stored energy.

Figure 4A:
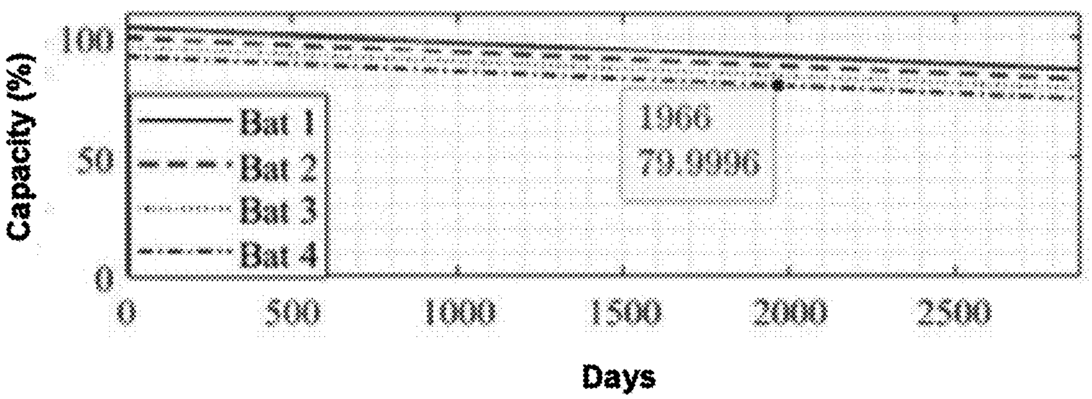
FIG. 4A illustrates the dispatched capacity of an accumulator bank using lithium-ion batteries, with the capacity in % (percentage) and the time in days, exemplifying the state of the art.
Figure 4B:
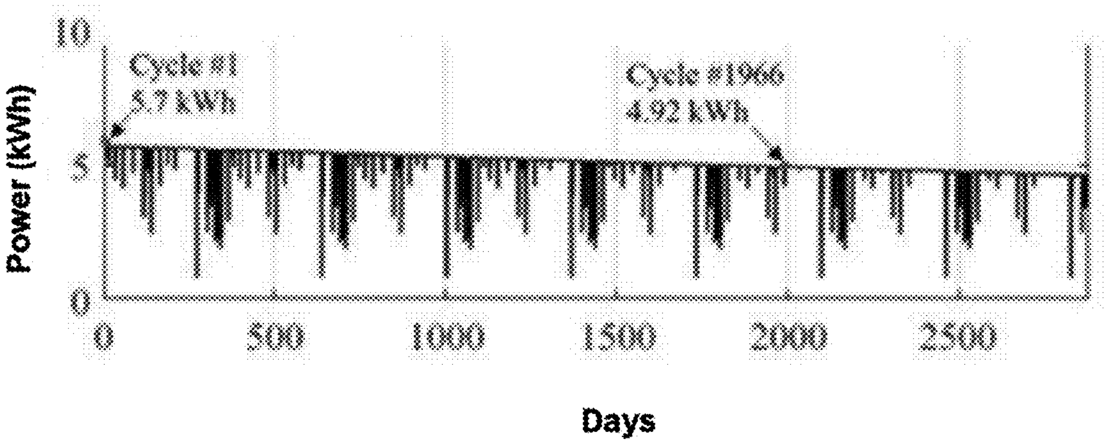
FIG. 4B illustrates the energy dispatched from an accumulator bank using lithium-ion batteries, with power in kWh and time in days, exemplifying the state of the art.

At each charge and discharge cycle, the bank energy capacity decreases due to the degradation and aging of the bank. FIG. 4 illustrates the behavior of the bank under conditions of the state of the art, without using the smart battery system and method developed in the invention. From the results presented, we realize that after 1966 days, the bank reaches 80% of its original capacity, being necessary to interrupt its operation and replace the accumulator elements.

Figure 5A:
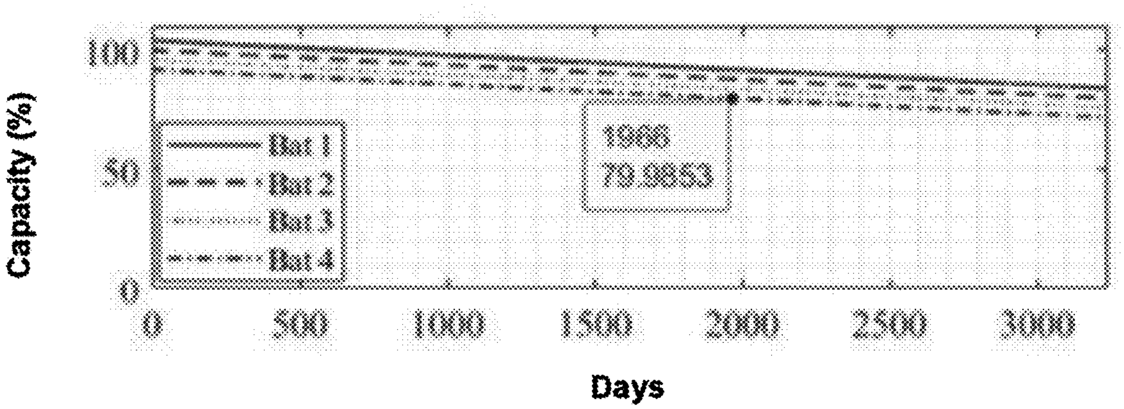
FIG. 5A illustrates the dispatched capacity of an accumulator bank using lithium-ion batteries, with capacity in % (percentage) and time in days, using the system and method of the present invention.
Figure 5B:
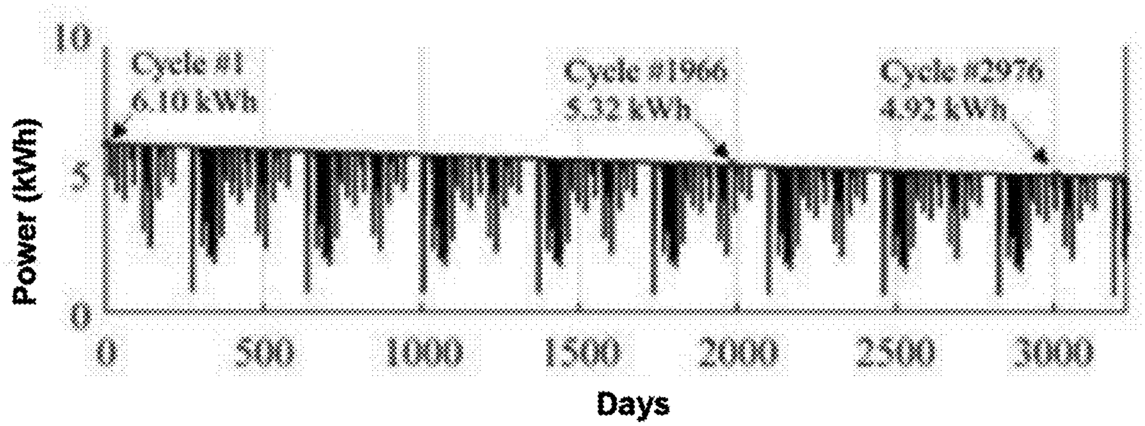
FIG. 5B illustrates the energy dispatched from an accumulator bank using lithium-ion batteries, with power in kWh and time in days, using the system and method of the present invention.

FIG. 5 shows the same system, operating under the same original conditions, but the accumulator system uses the invention (smart battery system and method) to manage the power flow and stored energy. In comparison with FIG. 4, after 1966 cycles, a battery reaches the end of its useful life, but with the use of the system and method developed in the present invention an unexpected technical effect is reached, which makes it feasible for the battery bank to continue in operation until the other accumulators exhaust all their capacity, increasing the number of cycles from 1966 to 2976. That is a significant increase of more than 1.5 times in relation to the result obtained with the state of the art

The invention claimed is:

1. A method for active power flow control and equalization for electrochemical accumulators connected to an electrical grid, the method comprises:

acting on a power demand of a charge;

measuring battery voltage, current, and temperature;

estimating a state of charge, health, and life of each battery in a bank;

calculating energy to be dispatched by each battery in the bank;

dispatching energy proportional to the state of health, charge, and life of each battery of the bank such that batteries having relatively better states of health, charge, and life dispatch more energy than batteries having relatively worse states of health, charge, and life and each battery dispatches only the energy it is capable of dispatching based on the battery's state of health, charge, and life;

processing all data in a central controller; and receiving and dispatching all information in a communication bus.

2. The method according to claim 1, wherein the central controller calculates the state of charge, health, and life of each battery.

3. The method according to claim 1, wherein the central controller selects which batteries from the bank deliver more energy and which deliver a smaller amount of energy throughout their useful life.

4. The method according to claim 1, wherein the method is continuous and happens uninterruptedly until all energy in the battery bank is completely drained.

* * * * *